United States Patent
Koshimizu et al.

(10) Patent No.: US 7,362,226 B2
(45) Date of Patent: Apr. 22, 2008

(54) CONTROL SYSTEM, SURFACE, AND CONTROL DEVICE

(75) Inventors: Minoru Koshimizu, Ebina (JP); Masao Watanabe, Ashigarakami-gun (JP); Hiroyuki Funo, Ashigarakami-gun (JP); Kiyoshi Iida, Ashigarakami-gun (JP); Ryota Mizutani, Ashigarakami-gun (JP); Yasunori Saito, Ebina (JP); Tsutomu Ishii, Ebina (JP); Hiroyuki Hotta, Ebina (JP); Naoki Hayashi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/205,004

(22) Filed: Aug. 17, 2005

(65) Prior Publication Data

US 2006/0214784 A1    Sep. 28, 2006

(30) Foreign Application Priority Data

Mar. 23, 2005   (JP)   ............................. 2005-084901

(51) Int. Cl.
*G08B 13/00*   (2006.01)

(52) U.S. Cl. ................... 340/566; 340/572.8; 340/666; 340/573.1; 340/870.16; 340/539.26; 330/313 A

(58) Field of Classification Search ...................... None
See application file for complete search history.

(56) References Cited

U.S. PATENT DOCUMENTS

| | | | | |
|---|---|---|---|---|
| 4,249,418 A | * | 2/1981 | Ebata | .......................... 374/117 |
| 4,312,228 A | * | 1/1982 | Wohltjen | ...................... 73/597 |
| 4,347,505 A | * | 8/1982 | Anderson | .................... 340/666 |
| 4,630,110 A | * | 12/1986 | Cotton et al. | ................ 348/153 |
| 5,691,698 A | * | 11/1997 | Scholl et al. | ............. 340/572.5 |
| 6,555,766 B2 | * | 4/2003 | Breed et al. | ................. 177/144 |
| 6,738,697 B2 | * | 5/2004 | Breed | ........................... 701/29 |
| 6,919,803 B2 | * | 7/2005 | Breed | ..................... 340/539.14 |

FOREIGN PATENT DOCUMENTS

| JP | A 2004-515757 | 5/2004 |
|---|---|---|
| WO | WO 02/46701 A2 | 6/2002 |

* cited by examiner

*Primary Examiner*—Benjamin C. Lee
(74) *Attorney, Agent, or Firm*—Oliff & Berridge, PLC

(57) ABSTRACT

The present invention provides a control system including: plural wireless measuring units, each of which, when receiving a radio signal, uses the signal as an energy source to measure a physical quantity, and generates and sends a radio signal having an attribute reflecting the measured physical quantity; a transmitter; a receiver; a storage unit which stores position data of the wireless measuring units in accordance with their identification data; a calculation unit which calculates physical quantities based on the received radio signals; a recognition unit which recognizes a distribution of the calculated physical quantities with reference to position data stored in accordance with identification data specified by the received radio signals; an identifying unit which identifies a state of an object on the surface based on the distribution of the recognized physical quantities; and a control unit which performs a control depending on the state of the identified object.

10 Claims, 5 Drawing Sheets

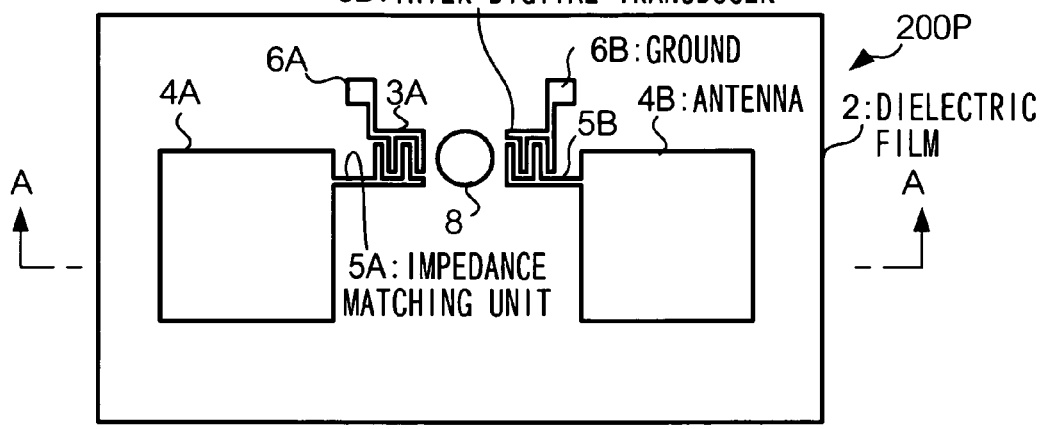
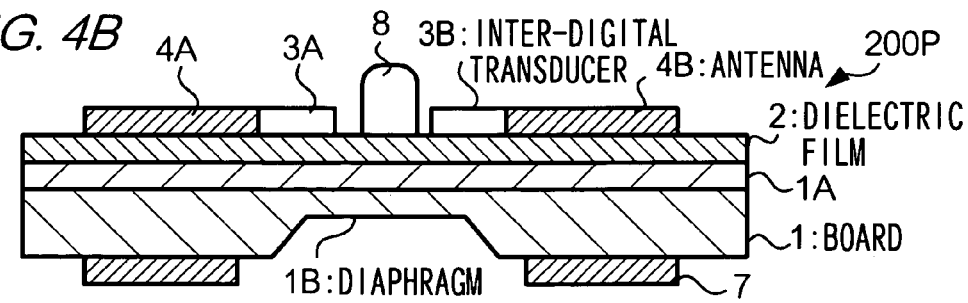
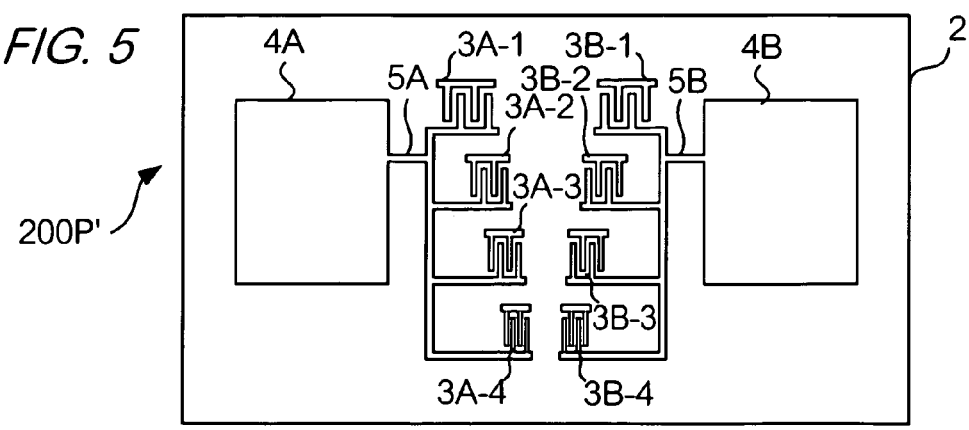

CONTROL SYSTEM, SURFACE, AND CONTROL DEVICE

This application claims priority under 35 U.S.C. §119 of Japanese Patent Application No. 2005-84901 filed on Mar. 23, 2005, the entire content of which is hereby incorporated by reference.

BACKGROUND OF THE INVENTION

1. Field of the Invention

The present invention relates to a technique for sensing the presence or absence of an object or the state of an object.

2. Description of the Related Art

In recent years, a system has been developed in which a wireless sensor is caused to sense the presence or absence of an object or the state of an object indoors or outdoors, and a control is performed on the basis of a result of the sensing. For example, in Japan Unexamined Patent Publication No. 2004-515757, it is disclosed that wireless sensors are located in a building, and air conditioning or lighting in the building is controlled on the basis of a result of sensing by the wireless sensors, that wireless sensors are located in a home and used for security, and that wireless sensors are located on a road and used for traffic safety.

However, since a conventional wireless sensor needs a battery to operate, it is necessary to periodically replace the battery of the wireless sensor. Therefore, if a system employs a lot of wireless sensors, a high degree of maintenance of the system is required.

The present invention has been made with a view to addressing the problem discussed above, and provides a technique for sensing the presence or absence of an object or the state of an object indoors or outdoors while requiring little maintenance.

SUMMARY OF THE INVENTION

To address the problem discussed above, the present invention provides a control system including: plural wireless measuring units provided in a surface, each of which wireless measuring units, when receiving a radio signal, uses the radio signal as an energy source to measure a physical quantity, and generates and sends a radio signal having an attribute reflecting the measured physical quantity; a transmitter which transmits a radio signal to the wireless measuring units; a receiver which receives radio signals from the wireless measuring units; a storage unit which stores position data of the wireless measuring units in accordance with identification data of the wireless measuring units; a calculation unit which calculates physical quantities on the basis of the radio signals received by the receiver; a recognition unit which recognizes a distribution of the physical quantities calculated by the calculation unit with reference to position data stored in accordance with identification data specified by the radio signals received by the receiver; an identifying unit which identifies a state of an object on the surface on the basis of the distribution of the physical quantities recognized by the recognition unit; and a control unit which performs a control depending on the state of the object identified by the identifying unit.

BRIEF DESCRIPTION OF THE DRAWINGS

Embodiments of the present invention will be described in detail with reference to the following figures, wherein:

FIG. 3 is a diagram illustrating a data configuration of position information table TBL1 according to the embodiment;

FIG. 4 is a diagram illustrating a configuration of pressure sensor 200P according to the embodiment;

FIG. 5 is a diagram illustrating a configuration of pressure sensor 200P tunable for plural frequencies;

DETAILED DESCRIPTION OF THE INVENTION

Figure 1:
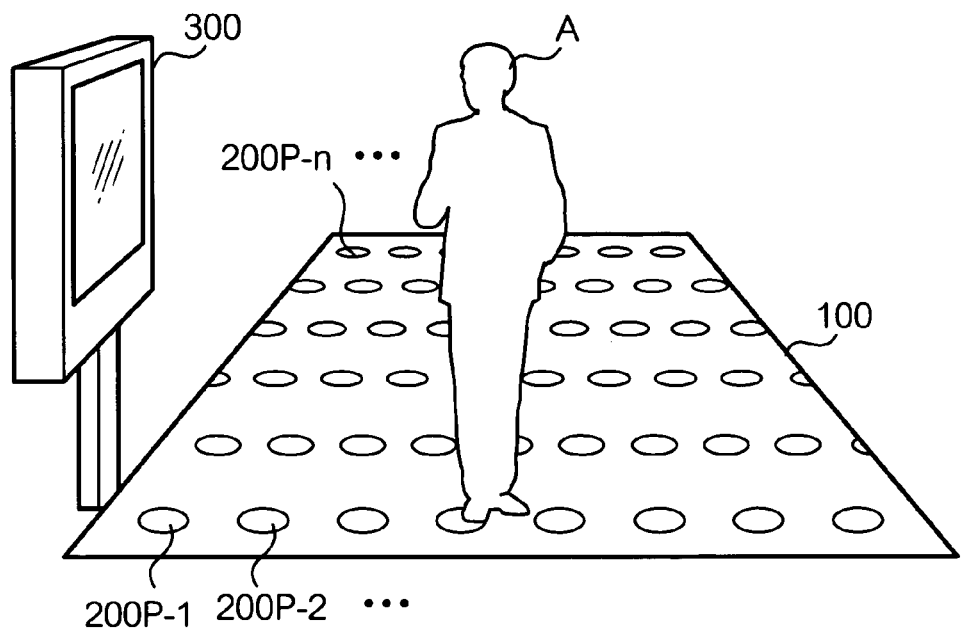
FIG. 1 is a diagram illustrating a configuration according to an embodiment of the present invention.

An embodiment of the present invention will be described with reference to the drawings.

1. Configuration

1-1. System Configuration

A configuration of a system according to the present embodiment will be described with reference to FIG. 1. In the drawing, the reference number 100 indicates a passable surface (hereinafter referred to as "surface 100") laid out indoors or outdoors. The reference numbers 200P-1 to 200P-n indicate a small wireless pressure sensor which does not require a battery and which measures pressure applied on surface 100. Pressure sensors 200P-1 to 200P-n are evenly dispersed in surface 100 in a high-density configuration. Accordingly, surface 100 is capable of high-accuracy detection.

Since each of pressure sensors 200P-1 to 200P-n does not have a battery, and thus does not require replacement of a battery, it is small and inexpensive to maintain when compared to a conventional pressure sensor.

Pressure sensors 200P-1 to 200P-n, when receiving a predetermined radio signal, send as a response to the received radio signal, a radio signal indicating a measured pressure. The frequency of a radio signal sent from each of pressure sensors 200P-1 to 200P-n is different. Accordingly, each of pressure sensors 200P-1 to 200P-n can be identified from the frequency of a radio signal it sends.

The configurations of pressure sensors 200P-1 to 200P-n will be described later.

In the following explanation, for simplicity, pressure sensors 200P-1 to 200P-n are referred to as "pressure sensor 200P" except where it is necessary to specify otherwise.

In FIG. 1, the reference number 300 indicates an information providing apparatus having a large display such as a liquid crystal display. The display of information providing apparatus 300 displays a variety of information viewable by a passerby on surface 100.

In FIG. 1, for simplicity, one passerby A is shown; but the number of passersby is not limited to one.

1-2. Configuration of Information Providing Apparatus 300

Figure 2:
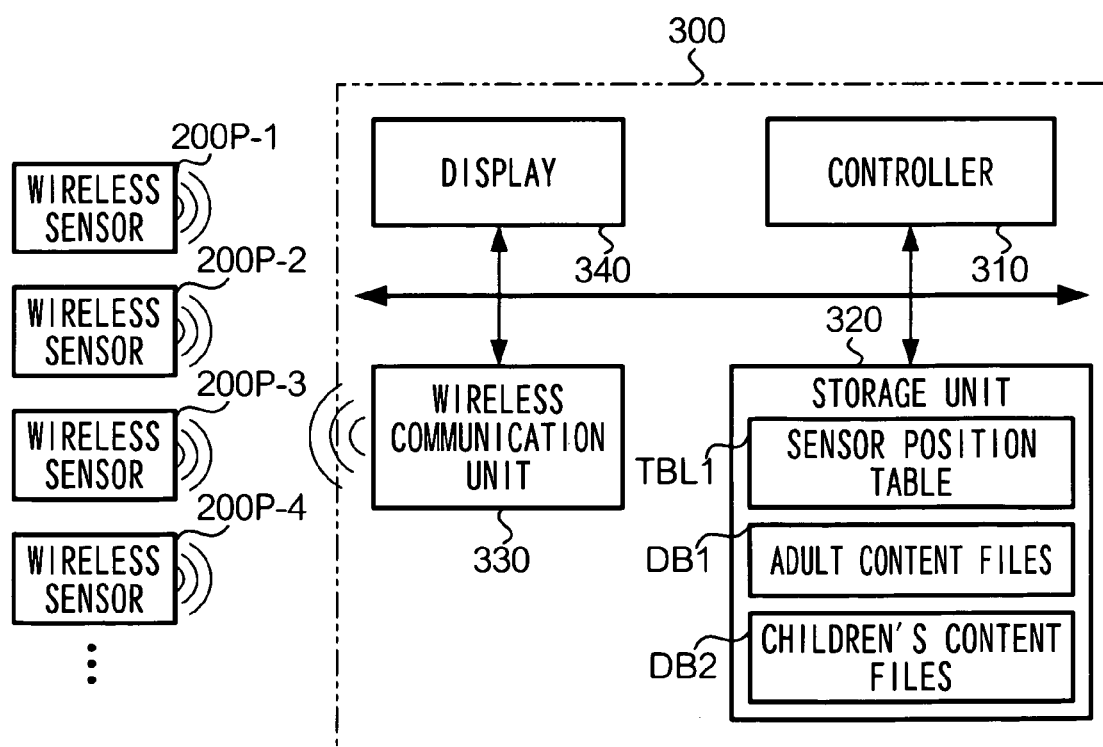
FIG. 2 is a block diagram illustrating information providing apparatus 300 according to the embodiment.

A configuration of information providing apparatus 300 will be described with reference to FIG. 2. FIG. 2 is a diagram illustrating an example of a configuration of information providing apparatus 300. Information providing apparatus 300 is an apparatus which provides a variety of information to a passerby in accordance with a radio signal sent from pressure sensor 200P provided in surface 100.

In the drawing, the reference number 310 indicates a controller including a processor such as a CPU, a ROM, a RAM, etc. The reference number 320 indicates a nonvolatile storage unit which is a mass storage device such as a hard disk and which stores programs for controlling components of information providing apparatus 300.

The processor of controller 310 reads and executes a program stored in storage unit 320, and thereby controls components of information providing apparatus 300.

Storage unit 320 stores a table (or a calculation formula) for converting a measurement result of pressure sensor 200P to a value indicating a pressure. Specifically, controller 310 converts, with reference to the table, the change of the frequency of a radio signal received from pressure sensor 200P to a value indicating a pressure.

Storage unit 320 also stores position information table TBL1, adult content files DB1, and children's content files DB2.

Position information table TBL1 stores, as shown in FIG. 3, items "Sensor ID" and "Position Information" in association with each other. Item "Sensor ID" is data for identifying pressure sensor 200P. The sensor ID is identified from the frequency of a radio signal received from pressure sensor 200P. Item "Position Information" is data indicating the position of pressure sensor 200P on surface 100. Controller 310 of information providing apparatus 300, by searching position for the sensor ID in information table TBL1, identifies the position of pressure sensor 200P.

Adult content files DB1 is a collection of files containing adult-oriented content such as news reports. Children's content files DB2 is a collection of files containing content for children such as animation.

Controller 310 of information providing apparatus 300, in a display control process described later, determines whether a passerby is an adult or a child on the basis of the intensity of a pressure measured by pressure sensor 200P; and depending on the determination result, reads a content file from adult content files DB1 or children's content files DB2; and causes display 340 to display information contained in the content file.

The reference number 330 indicates a wireless communication unit with an antenna which sends a radio signal to pressure sensor 200P and receives a radio signal from pressure sensor 200P. As described above, since the frequency of a radio signal of each pressure sensor 200P provided in surface 100 is different, controller 310 of information providing apparatus 300 can identify pressure sensor 200P on the basis of the frequency of a radio signal received via wireless communication unit 330.

The reference number 340 indicates a large display such as a liquid crystal display. Controller 310 of information providing apparatus 300 changes information displayed on display 340 depending on a pressure measured by pressure sensor 200P.

1-3. Configuration and Basic Operation of Pressure Sensor 200P

A configuration and a basic operation of pressure sensor 200P according to the present embodiment will be described.

1-3-1. Configuration of Pressure Sensor 200P

FIG. 4 is a diagram illustrating a configuration of pressure sensor 200P according to the present embodiment. Pressure sensor 200P includes: Si board 1 which is a base; dielectric film 2 which is formed on Si board 1 via oxide film 1A and on which a surface acoustic wave is propagated; a pair of inter-digital transducers 3A and 3B which are formed on dielectric film 2 and convert an electrical signal to a surface acoustic wave, or vice versa; antennas 4A and 4B which are connected to an end of inter-digital transducers 3A and 3B via impedance matching units 5A and 5B respectively, and exchanges a radio signal with an external transmitter/receiver; grounds 6A and 6B which are connected to another end of inter-digital transducers 3A and 3B, respectively; ground electrode 7 which is formed on the underside surface of Si board 1 and connected with grounds 6A and 6B via through holes; and pressure receiver 8. Pressure receiver 8 is provided on dielectric film 2 so that it projects upward from pressure sensor 200P. When external pressure is applied to the tip of pressure receiver 8, dielectric film 2 is warped and thereby the frequency of a surface acoustic wave which propagates on dielectric film 2 is altered.

On the underside surface of Si board 1, a concave having a tapered inner side surface with 54.75 degrees is formed by anisotropic etching, the bottom of which is diaphragm 1B susceptible to external pressure. Oxide film 1A is rendered a little thicker in the drawing, but in fact how thick oxide film 1A is does not matter as long as it can provide insulation between Si board 1 and dielectric film 2.

The frequency of a surface acoustic wave of pressure sensor 200P depends on the shapes of inter-digital transducers 3A and 3B and impedance matching units 5A and 5B.

Inter-digital transducers 3A and 3B, antennas 4A and 4B, impedance matching units 5A and 5B, and grounds 6A and 6B are formed integrally as a conductive pattern. A material of the conductive pattern may be a metal such as Ti, Cr, Cu, W, Ni, Ta, Ga, In, Al, Pd, Pt, Au, and Ag, and an alloy such as Ti—Al, Al—Cu, Ti—N, and Ni—Cr. In the metals, especially Au, Ti, W, Al, and Cu are preferable. The conductive pattern preferably consists of a single layer or multilayer structure of the metal or alloy. The thickness of the metal layer preferably ranges from 1 nanometer to 10 micrometers.

In pressure sensor 200P, $LiTaO_3$ is used as a material of dielectric film 2 of FIG. 4. In a crystal of $LiTaO_3$, the propagation velocity of its surface acoustic wave is responsive to a pressure change. The temperature coefficient of a crystal of $LiTaO_3$ is approximately $18.0 \times 10^{-6}$ per degree, which is one fourth that of $LiNbO_3$, and when the temperature of a crystal of $LiTaO_3$ changes by 10 degrees, the frequency of a surface acoustic wave changes by 0.005 percent. Therefore, according to pressure sensor 200P made of $LiTaO_3$, a pressure change is detected without being affected by the change of surrounding temperature.

Since dielectric film 2 is laid on diaphragm 1B via oxide film 1A, if external pressure of 2 bars is applied to diaphragm 1B, a warp of diaphragm 1B causes the distance between inter-digital transducers 3A and 3B on dielectric film 2 to change, and thereby the velocity of a surface acoustic wave is altered. Consequently, the frequency of the surface acoustic wave changes from center frequency f0 by 0.2 percent. If the temperature change of a measuring object is significant, the frequency of a surface acoustic wave may be corrected by using a temperature sensor in combination.

Inter-digital transducers 3A and 3B, antennas 4A and 4B, and impedance matching units 5A and 5B generate a mechanical vibration of the same center frequency f0 as that of a radio signal sent from wireless communication unit 330 of information providing apparatus 300, and the strength of a radio signal received by wireless communication unit 330 from pressure sensor 200P is altered by the change of a frequency caused on dielectric film 2 of pressure sensor 200P. The strength of the radio signal received by wireless communication unit 330 changes linearly in response to a pressure change.

In pressure sensor 200P discussed above, a concave is formed on Si board 1, the bottom of which is used as diaphragm 1B. However, oxide film 1A may be used as a diaphragm. In summary, as long as an external pressure affects dielectric film 2 directly or indirectly, the configuration of diaphragm 1B does not matter.

Dielectric film 2 may be epitaxial or may have a single orientation in view of the electromechanical coupling coefficient/piezoelectric coefficient of inter-digital transducer 3 and of the dielectric loss of antenna 4. Also, on dielectric film 2, a film including a III-V series semiconductor such as GaAs or carbon such as diamond may be formed. As a result, the surface velocity of a surface acoustic wave, the coupling coefficient, and the piezoelectric constant are improved.

1-3-2. Basic Operation of Pressure Sensor 200P

A basic operation of pressure sensor 200P will be described with reference to FIG. 4.

For clarity of explanation, it is assumed in the following description that a signal in FIG. 4(*a*) travels from antenna 4A to antenna 4B. However, the signal may travel from antenna 4B to antenna 4A.

Pressure sensor 200P exchanges a radio signal with wireless communication unit 330 of information providing apparatus 300. A radio signal sent from wireless communication unit 330 is received by antenna 4A, and inter-digital transducer 3A, in response to the radio signal, excites dielectric film 2 to generate a mechanical vibration. The mechanical vibration causes a surface acoustic wave on dielectric film 2. The surface acoustic wave is propagated from inter-digital transducer 3A toward inter-digital transducer 3B, during which the surface acoustic wave varies in response to a change in pressure applied on dielectric film 2 in terms of the attributes of the surface acoustic wave such as amplitude, phase difference, and frequency, etc. The surface acoustic wave which has reached inter-digital transducer 3B is converted by inter-digital transducer 3B to an electrical signal and sent via antenna 4B. The radio signal sent from pressure sensor 200P is received by wireless communication unit 330.

The radio signal received by wireless communication unit 330 is converted to an electrical signal and analyzed, and consequently the pressure measured by pressure sensor 200P is calculated.

1-3-3. Support for Plural Pressure Sensors 200P

In the foregoing sections 1-3-1 to 1-3-2, a pressure sensor tunable for a single frequency is described. Now, a pressure sensor tunable for plural frequencies will be described.

As shown in FIG. 5, in pressure sensor 200P', inter-digital transducers 3A-1 to 3A-4 and 3B-1 to 3B-4 are provided, which are different to each other in shape. In pressure sensor 200P', surface acoustic waves corresponding to plural frequencies for which inter-digital transducers 3A-1 to 3A-4 and 3B-1 to 3B-4 can be tuned are generated on dielectric film 2.

For example, it is assumed that inter-digital transducers 3A-1 and 3B-1 and impedance matching units 5A and 5B are tunable for frequency f1, inter-digital transducers 3A-2 and 3B-2 and impedance matching units 5A and 5B are tunable for frequency f2, inter-digital transducers 3A-3 and 3B-3 and impedance matching units 5A and 5B are tunable for frequency f3, and inter-digital transducers 3A-4 and 3B-4 and impedance matching units 5A and 5B are tunable for frequency f4.

Please note that in FIG. 5, grounds and a ground electrode are omitted.

If a radio signal having frequency f1 is sent from information providing apparatus 300, inter-digital transducer 3A-1 generates a mechanical vibration, which causes a surface acoustic wave on dielectric film 2. The surface acoustic wave is propagated to inter-digital transducer 3B-1, during which the attribute of the surface acoustic wave changes under the influence of a pressure.

On the other hand, in the other inter-digital transducers 3A-2 to 3A-4 and 3B-2 to 3B-4, generation of a surface acoustic wave and subsequent transmission of a radio signal are not performed, because they are not tuned for frequency f1.

If a radio signal having frequency f2 is sent to pressure sensor 200P', a surface acoustic wave is propagated from inter-digital transducer 3A-2 to inter-digital transducer 3B-2, and a radio signal corresponding to the surface acoustic wave is sent via antenna 4B.

If a radio signal having frequency f3 is sent to pressure sensor 200P', a surface acoustic wave is propagated from inter-digital transducer 3A-3 to inter-digital transducer 3B-3, and a radio signal corresponding to the surface acoustic wave is sent via antenna 4B.

If a radio signal having frequency f4 is sent to pressure sensor 200P', a surface acoustic wave is propagated from inter-digital transducer 3A-4 to inter-digital transducer 3B-4, and a radio signal corresponding to the surface acoustic wave is sent via antenna 4B.

Accordingly, if four radio signals which have frequencies f1, f2, f3, and f4 respectively are sent to pressure sensor 200P' in a certain order, wireless communication unit 330 of information providing apparatus 300 receives signals corresponding to the frequencies in that order.

In this case, if the variation widths (the width of a change due to a pressure) of the frequency of a radio signal sent from inter-digital transducers 3B-1 to 3B-4 (output side) are set so that they do not overlap with each other, even if the four radio signals having frequencies f1 to f4 respectively are sent to pressure sensor 200P' simultaneously, the four signals received in response can be separated and analyzed.

For example, it is assumed that four pressure sensors 200P-1 to 200P-4 are attached to four measuring objects, respectively. Specifically, in pressure sensor 200P-1, inter-digital transducers 3A-1 and 3B-1 of pressure sensor 200P' (see FIG. 5) are formed; in pressure sensor 200P-2, inter-digital transducers 3A-2 and 3B-2 of pressure sensor 200P' are formed; in pressure sensor 200P-3, inter-digital transducers 3A-3 and 3B-3 of pressure sensor 200P' are formed; and in pressure sensor 200P-4, inter-digital transducers 3A-4 and 3B-4 of pressure sensor 200P-4 are formed. Accordingly, the frequency of a surface acoustic wave generated on dielectric film 2 of each pressure sensor is f1, f2, f3, and f4, respectively. Accordingly, on the basis of the frequency of a received radio signal, it can be determined as to which of the pressure sensors 200P-1 to 200P-4 is the source of the radio signal.

Accordingly, if a radio signal having frequency f1 is sent, a measurement is performed by pressure sensor 200P-1; if a radio signal having frequency f2 is sent, a measurement is performed by pressure sensor 200P-2; if a radio signal having frequency f3 is sent, a measurement is performed by pressure sensor 200P-3; and if a radio signal having frequency f4 is sent, a measurement is performed by pressure sensor 200P-4.

2. Operation

An operation of a system according to the present embodiment will be described with reference to FIG. 6.

In the operation, controller 310 of information providing apparatus 300 identifies, on the basis of radio signals from pressure sensors 200P, the number of passersby on surface 100, the distance between display 340 and a passerby, the attribute of a passerby (adult or child), and controls display 340 on the basis of the obtained information.

Figure 6:
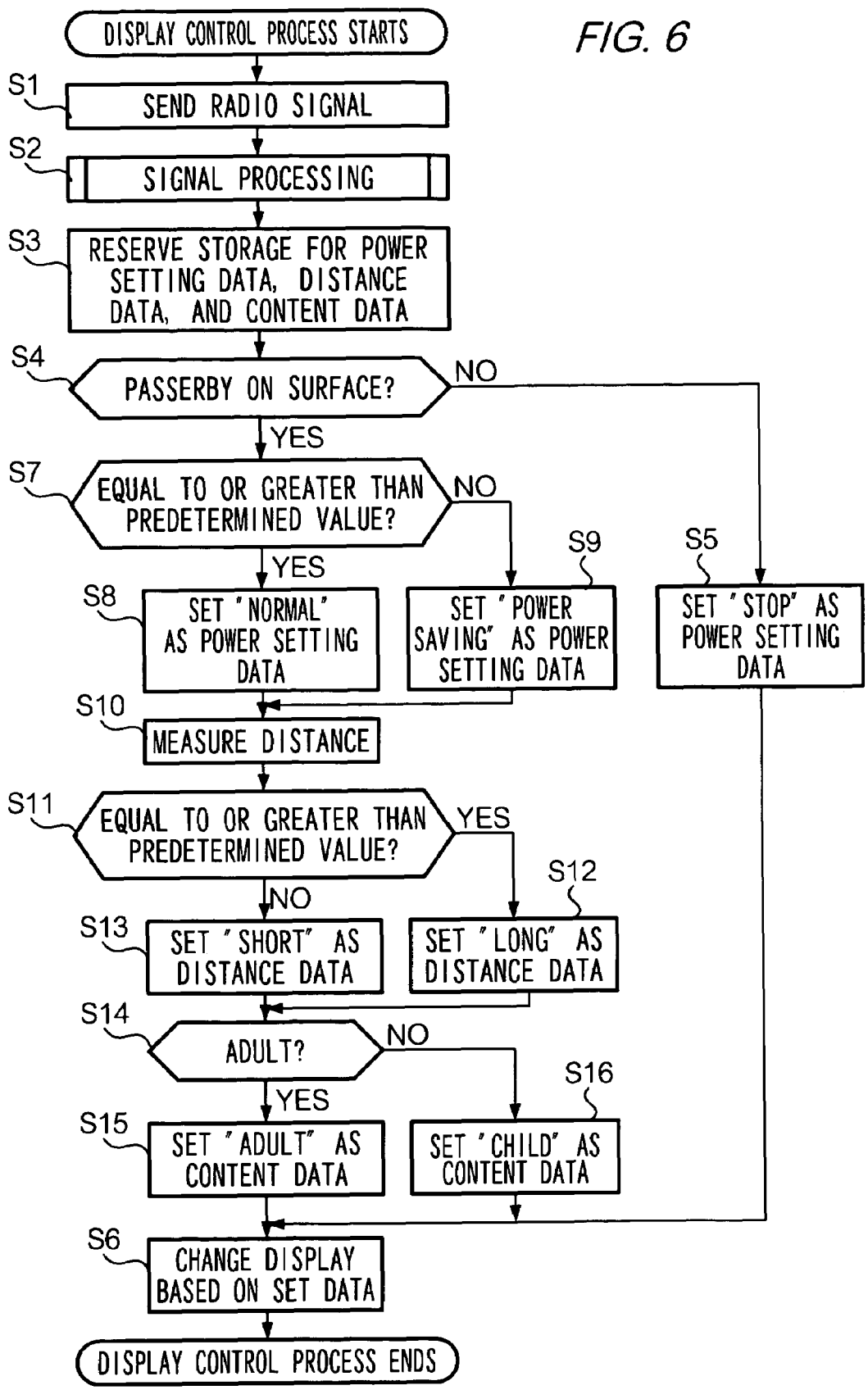
FIG. 6 is a flowchart illustrating a display control process performed by controller 310 according to the embodiment.

FIG. 6 is a flowchart illustrating a display control process performed by controller 310.

Controller 310 of information providing apparatus 300 sends predetermined radio signals to plural pressure sensors 200P provided in surface 100 (Step S1). Each of pressure sensors 200P, when receiving a radio signal, sends as a response a radio signal indicating a measured pressure. Controller 310 of information providing apparatus 300, when receiving radio signals from pressure sensors 200P via wireless communication unit 330, processes the signals to calculate the values of pressures measured by pressure sensors 200P (Step S2).

2-1. Signal Processing Operation

Figure 7:
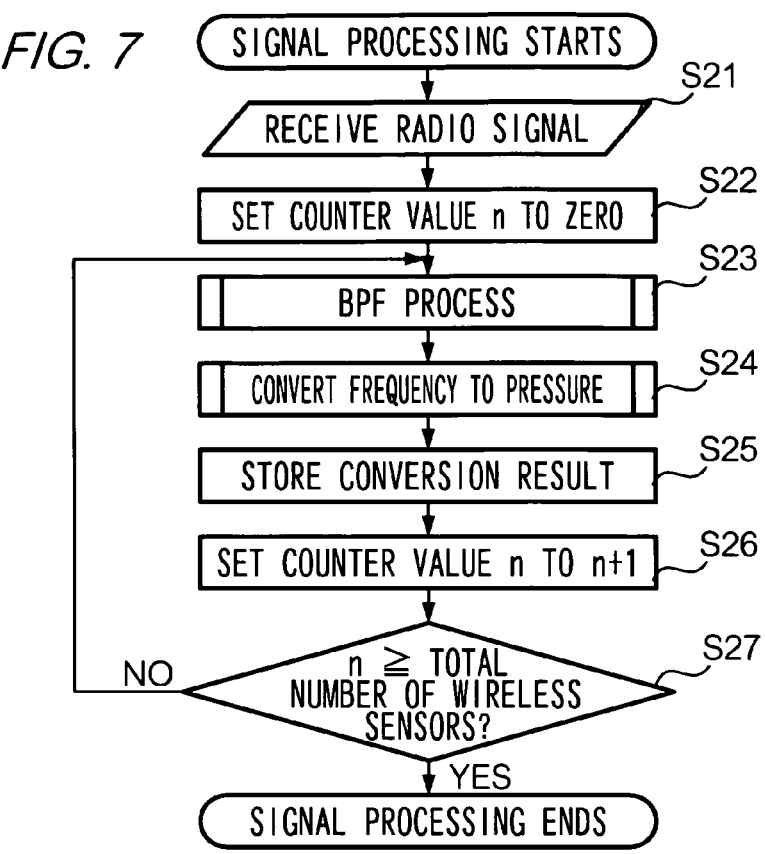
FIG. 7 is a flowchart illustrating a signal processing performed by controller 310 according to the embodiment.

Now, a signal processing operation on radio signals received from pressure sensors 200P will be described with reference to FIGS. 2 and 7.

In the following description, it is assumed that four pressure sensors 200P-1 to 200P-4 are used, but the number of pressure sensors may also be more than or less than four.

In FIG. 2, in pressure sensor 200P-1, inter-digital transducers 3A-1 and 3B-1 of pressure sensor 200P' (see FIG. 5) are formed; in pressure sensor 200P-2, inter-digital transducers 3A-2 and 3B-2 of pressure sensor 200P' are formed; in pressure sensor 200P-3, inter-digital transducers 3A-3 and 3B-3 of pressure sensor 200P' are formed; and in pressure sensor 200P-4, inter-digital transducers 3A-4 and 3B-4 of pressure sensor 200P' are formed. Accordingly, the frequency of a surface acoustic wave generated on dielectric film 2 of each pressure sensor is f1, f2, f3, and f4, respectively. Accordingly, on the basis of the frequency of a received radio signal, it can be determined which of the pressure sensors 200P-1 to 200P-4 is the source of the radio signal.

Also, in the following description, it is assumed that controller 310 of information providing apparatus 300 sends radio signals which have sine waves and which have frequencies f1, f2, f3, and f4 respectively to pressure sensors 200P-1 to 200P-4 via wireless communication unit 330, and that each of pressure sensors 200P-1 to 200P-4 sends a radio signal having a frequency which has changed in response to a measured pressure to wireless communication unit 330 of information providing apparatus 300.

First, controller 310 receives radio signals wherein four frequencies are mixed from pressure sensors 200P-1 to 200P-4 via wireless communication unit 330 (Step S21). Controller 310 sets value n of a counter (not shown) to "0" (Step S22).

Controller 310 performs a BPF process to extract frequency f1 (Step S23), and calculates a pressure measured by pressure sensor 200P-1 on the basis of a table pre-stored in storage unit 320 (Step S24). Controller 310 subsequently stores the calculation result in its RAM (Step S25).

Controller 310 increments the counter from n to n+1 (Step S26), and determines whether the incremented value has become equal to or more than "4" (Step S27). When it is determined that the incremented value is less than "4" (Step S27; No), namely all pressures measured by four pressure sensors 200P-1 to 200P-4 have not been calculated, controller 310 repeats the operation of Step S23 and subsequent operations. When it is determined that the incremented value has reached "4" (Step S27; Yes), namely all pressures measured by four pressure sensors 200P-1 to 200P-4 have been calculated, controller 310 ends the signal processing operation.

Reverting to FIG. 6, after the signal processing of Step S2 of the drawing, controller 310 of information providing apparatus 300 reserves storage for power setting data, distance data, and content data in a RAM, etc (Step S3). The data is used when the information displayed on display 340 is changed. Controller 310 sets the data on the basis of pressures measured by pressure sensors 200P, and changes the information displayed on display 340 on the basis of the set data.

Specifically, first, controller 310 determines whether any passerby is on surface 100 on the basis of pressures measured by pressure sensors 200P (Step S4). If any of pressure sensors 200P measures pressure, controller 310 determines that a passerby is on surface 100, and if none of pressure sensors 200P measures any pressure, controller 310 determines that no passerby is on surface 100. If it is determined that no passerby is on surface 100 (Step S4; No), controller 310 sets "Stop" as power setting data (Step S5), and controls the display of display 340 in accordance with the set data (Step S6). In this case, display 340 stops displaying information and information providing apparatus 300 enters a dormant state.

Consequently, if there is no passerby to view display 340 of information providing apparatus 300, unnecessary power consumption by display 340 is avoided.

On the other hand, if it is determined that a passerby is on surface 100 (Step S4; Yes), controller 310 identifies the number of passersby on surface 100 from the number of pressure sensors 200P which have measured pressure, and determines whether the identified head-count is equal to or more than a predetermined value (Step S7). If the head-count is equal to or more than the predetermined value (Step S7; Yes), controller 310 sets "Normal" as power setting data (Step S8), and if the head-count is less than the predetermined value (Step S7; No), controller 310 sets "Power Saving" as power setting data (Step S9). Controller 310, when "Power Saving" is set as power setting data, performs a display control such as displaying only static images instead of moving images. Thus, if few passersby are available to view display 340 of information providing apparatus 300, power consumption of display 340 is reduced.

Subsequently, controller 310 searches position information table TBL1 by the sensor ID of pressure sensor 200P which has measured some pressure, and identifies the distance between display 340 and a passerby on the basis of the searched position information (Step S10). If plural passersby are on surface 100, the distance is identified by averaging of the distances between display 340 and each passerby. Controller 310 determines whether the identified distance is equal to or more than a predetermined value (Step S11). If it is determined that the distance is equal to or more than the predetermined value (Step S11; Yes), controller 310 sets "Long" as distance data (Step S12); if the distance is less than the predetermined value (Step S11, No), controller 310 sets "Short" as distance data (Step S13).

Subsequently, controller 310 determines whether a passerby on surface 100 is an adult or a child (Step S14). The determination is made on the basis of whether a pressure measured by pressure sensor 200P is equal to or more than a predetermined value. If the pressure is equal to or more than the predetermined value, controller 310 determines that the passerby is an adult, and if the pressure is less than the predetermined value, controller 310 determines that the passerby is a child. If it is determined that the passerby is an adult (Step S14; Yes), controller 310 sets "Adult" as content data (Step S15), and if it is determined that the passerby is a child (Step S14; No), controller 310 sets "Child" as content data (Step S16). If plural passersby are on surface 100, among pressure sensors 200P which have measured some pressure, the total number of pressure sensors 200P which have measured a pressure that is equal to or more than the predetermined value and the total number of pressure sensors 200P which have measured a pressure that is less than the predetermined value are counted, and the two results are compared. As a result, if the former number is equal to or more than the latter number, controller 310 sets "Adult" as content data, and if the former number is less than the latter number, controller 310 sets "Child" as content data.

Subsequently, controller 310 controls the display of display 340 in accordance with the set data (Step S6).

When "Child" is set as content data, controller 310 reads a content file from children's content files DB2, and causes display 340 to display information contained in the content file. When "Adult" is set as content data, controller 310 reads a content file from adult content files DB1, and causes display 340 to display information contained in the content file. Thus, information appropriate to a passerby is provided.

When "Long" is set as distance data, controller 310 increases the sizes of text and images displayed on display 340 so that a passerby located far away from display 340 can view the information. When "Short" is set as distance data, controller 310 reduces the size of text and images displayed on display 340 so that the amount of information provided to a passerby can be increased. Thus, the display of display 340 is controlled depending on the position of a passerby.

As described above, according to the system of the present embodiment, the presence or absence of an object is sensed by a wireless sensor, and on the basis of the sensing result, an apparatus in the system is controlled.

3. Modifications

The embodiment of the present invention discussed above may be modified as described below.

3-1.

In the above embodiment, a wireless sensor provided in a surface is not limited to a pressure sensor, but may be a temperature sensor which measures the temperature on a surface, a light intensity sensor which measures the intensity of light irradiated on a surface, etc. as long as it can sense the presence or absence or the state of a passerby. For example, if a light intensity sensor is used, the presence or absence or the state of a passerby is identified on the basis of whether light is sensed.

Below, the configurations of the temperature sensor and the light intensity sensor will be described.

3-1-1. Temperature Sensor

Figure 8A:
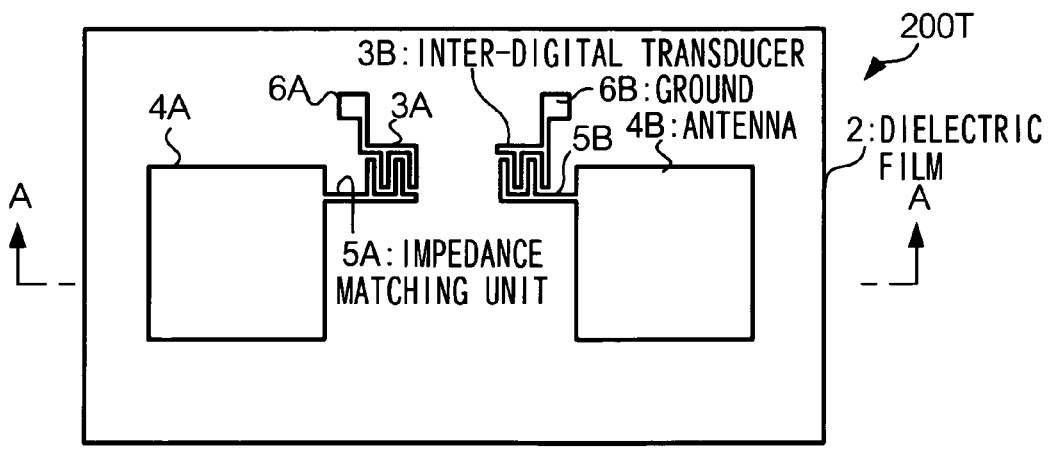
FIG. 8 is a diagram illustrating a configuration of a temperature sensor.
Figure 8B:
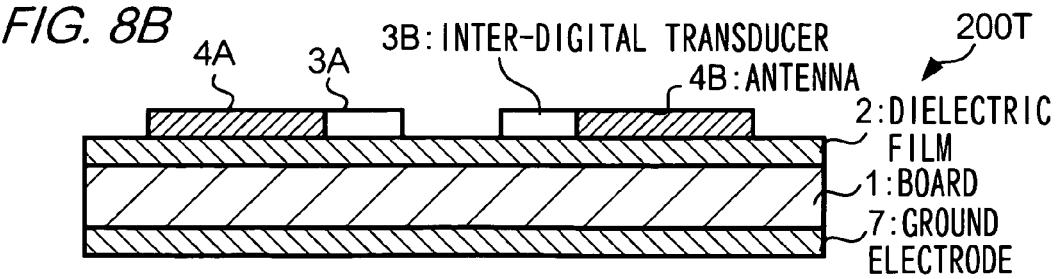

FIG. 8 is a diagram illustrating a configuration of a temperature sensor 200T. As shown in the drawing, temperature sensor 200T is different from pressure sensor 200P of FIG. 4 in not having pressure receiver 8 and diaphragm 1B.

In temperature sensor 200T, $LiNbO_3$ is used as a material of dielectric film 2 of FIG. 8. In a crystal of $LiNbO_3$, the propagation velocity of its surface acoustic wave is responsive to a temperature change, and a change of the propagation velocity due to a temperature change causes the frequency of a surface acoustic wave to change. The temperature coefficient is approximately $75 \times 10^{-6}$ per degree centigrade. An experiment shows, as an example, that when the temperature of a crystal of $LiNbO_3$ changes by 100 degrees centigrade, the frequency of a surface acoustic wave changes from center frequency f0 by 0.2 percent to 0.3 percent.

3-1-2. Light Intensity Sensor

Figure 9:
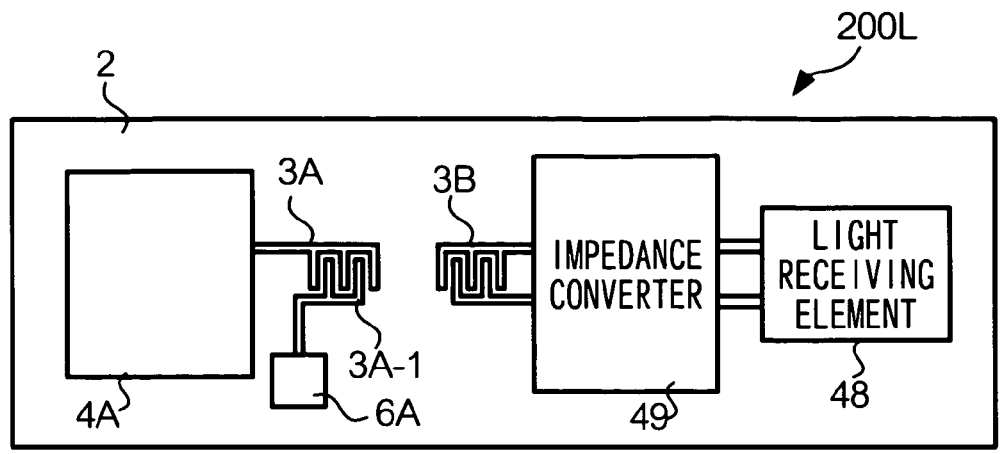
FIG. 9 is a diagram illustrating a configuration of a light intensity sensor.

FIG. 9 is a diagram illustrating a configuration of light intensity sensor 200L. As shown in the drawing, light intensity sensor 200L is different from pressure sensor 200P of FIG. 4 in not having pressure receiver 8 and diaphragm 1B and in having light receiving element 48 such as a photodiode and impedance converter 49 connected to one end of inter-digital transducer 3B.

When light (illuminance: 1000lx) is irradiated on light receiving element 48, the impedance of light receiving element 48 changes in response to the luminous intensity. The impedance change of light receiving element 48 causes the impedance of inter-digital transducer 3B to change via impedance converter 49 which matches impedances of light receiving element 48 and inter-digital transducer 3B. Consequently, the reflection intensity of inter-digital transducer 3B in reflecting a surface acoustic wave propagated from inter-digital transducer 3A changes. As a result, the strength of a radio signal sent from light sensor 40 changes from a standard electric field strength by 0.1 percent.

3-2.

In the above embodiment, a wireless sensor may be provided in a floor of a home, a wall inside or outside a home, or a floor mat, instead of a surface.

Figure 10:
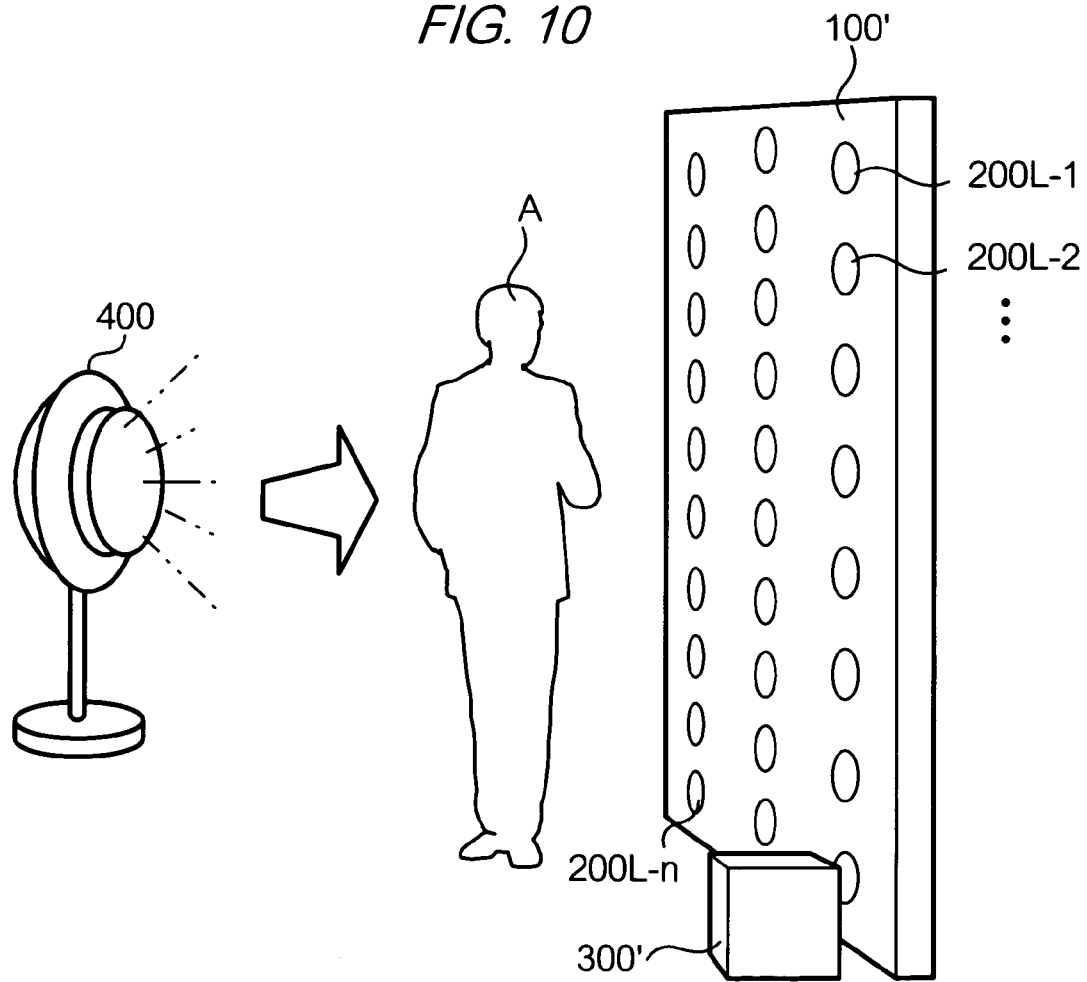
FIG. 10 is a diagram illustrating a configuration of a system according to a modification of the present invention.

Below, an example of a system where light intensity sensors 200L are provided in a wall will be described with reference to FIG. 10.

In the drawing, the reference number 100' indicates a wall of a home, where plural light intensity sensors 200L-1 to 200L-n, which measure the intensity of light irradiated on wall 100', are provided. Light intensity sensors 200L-1 to 200L-n are small wireless sensors, which do not require a battery, and are arranged evenly over wall 100'.

The reference number 400 indicates a light irradiation device which irradiates light on wall 100'. As shown in FIG. 10, if passerby A is in front of wall 100', light intensity sensors 200L located in the shadow of passerby A do not measure light irradiated from light irradiation device 400; the other light intensity sensors 200L measure the irradiated light. On the basis of the distribution of light intensity sensors 200L which have sensed the light (or light intensity sensors 200L which have not sensed the light), the presence of absence or the state of a passerby is identified.

3-3.

In the above embodiment, display 340 of information providing apparatus 300 may be a plasma display, magnetophoretic display, an electrophoretic display, or an imaging device using movable particles (a toner display), instead of a liquid crystal display.

Information providing apparatus 300 may be a personal computer, an image forming apparatus, or a television.

Also, in the above embodiment, information may be output by voice, instead of or in addition to being displayed, as long as the information is appropriately provided to a passerby.

3-4.

In the above embodiment, by arranging pressure sensors 200P in surface 100 in a much higher density state, a determination of the presence or absence of a passerby may be made on the basis of whether the distribution of pressures measured by pressure sensors 200P forms a footprint of a passerby.

3-5.

In the above embodiment, on the basis of the intensities of measured pressures, information other than the number of passersby, the distances between display 430 and passersby, and the attributes (adult or child) of passersby may be identified. For example, on the basis of a fact that the distribution of measured pressures forms a footprint of high heels, the passerby can be determined to be a woman.

Also, on the basis of a change over time of positions where a pressure is measured, the moving direction of a passerby on surface 100, namely whether the passerby moves closer to or away from display 340 may be determined.

3-6.

Control operations based on measurement results of pressure sensors 200P are not limited to the operations described in the above embodiment, and may include turning up the volume on display 340 if a passerby is located away from display 340, or running a telop for an advertisement if a large number of passersby are on surface 100.

3-7.

In the above embodiment, instead of plural wireless sensors of one type, plural wireless sensors of more than one type, such as a pressure sensor and a light intensity sensor, may be provided in surface 100. According to the configuration, since physical quantities of plural types can be recognized, a high-accuracy detection is realized.

In the above embodiment, for identifying each pressure sensor 200P, instead of differentiating the shape and size of inter-digital transducers 3A and 3B, it is possible to differentiate the distance between inter-digital transducers 3A and 3B of each pressure sensor 200P and thereby differentiate the frequency of a surface acoustic wave generated on dielectric film 2. By differentiating the distance between inter-digital transducers 3A and 3B of each pressure sensor 200P, the propagation time of a surface acoustic wave generated on dielectric film 2 of each pressure sensor 200P is differentiated. Accordingly, by measuring a time from transmission of a radio signal by wireless communication unit 330 to reception of a radio signal by the same unit, each pressure sensor 200P is identified.

Also, the waveform of a radio signal sent to pressure sensor 200P may be a sine wave, a chopping wave, etc. other than a sine wave.

3-8.

In the above embodiment, an object to be identified may be a vehicle instead of a person. In this case, as in the case of a person, the position, the size and the movement of a vehicle is identified on the basis of measured physical quantities such as pressure, light intensity, etc.

3-9.

In the above embodiments, each component of pressure sensor 200P may be made of other materials.

Board 1 of pressure sensor 200P may be made of: an elemental semiconductor such as Si, Ge, and diamond; glass; a III-V series compound semiconductor such as AlAs, AlSb, AlP, GaAs, GaSb, InP, InAs, InSb, AlGaP, AlInP, AlGaAs, AlInAs, AlAsSb, GaInAs, GaInSb, GaAsSb, and InAsSb; a II-VI series compound semiconductor such as ZnS, ZnSe, ZnTe, CaSe, CdTe, HgSe, HgTe, and CdS; oxide such as Nb-doped or La-doped $SrTiO_3$, Al-doped ZnO, $In_2O_3$, $RuO_2$, $BaPbO_3$, $SrRuO_3$, $YBa_2Cu_3O_{7-x}$, $SrVO_3$, $LaNiO_3$, $La_{0.5}Sr_{0.5}CoO_3$, $ZnGa_2O_4$, $CdGa_2O_4$, $MgTiO_3$, and $Mg_2TiO_4$, which are conductive or semi-conductive single crystal substrate; and metal such as Pd, Pt, Al, Au, Ag. However, in view of the suitability to an existing semiconductor production process and the production cost, it is preferable to use Si, GaAs, glass as a material of board 1.

Dielectric film 2 may be made of:, instead of $LiNbO_3$ or $LiTaO_3$, oxide such as $SiO_2$, $SrTiO_3$, $BaTiO_3$, $BaZrO_3$, $LaAlO_3$, $ZrO_2$, $Y_2O_3 8\%$-$ZrO_2$, MgO, $MgAl_2O_4$, $Al_2O_3$, ZnO; a tetragonal system, orthorhombic system, or pseudo-cubic system material such as $BaTiO_3$, $PbTiO_3$, $Pb_{1-x}La_x(Zr_yTi_{1-y})_{1-x/4}O_3$ (PZT, PLT, PLZT depending on the values of X and Y), $Pb(Mg_{1/3}Nb_{2/3})O_3$, $KNbO_3$, which are $ABO_3$-perovskite-type; a ferroelectric such as $LiNbO_3$ and $LiTaO_3$ which are a pseudo-ilmenite structure; $Sr_xBa_{1-x}Nb_2O_6$ and $Pb_xBa_{1-x}Nb_2O_6$ which are tungsten-bronze-type. Dielectric film 2 may also be made of $B_4Ti_3O_{12}$, $Pb_2KNb_5O_{15}$, $K_3Li_2Nb_5O_{15}$, and a substitution dielectric of the enumerated ferroelectrics. Dielectric film 2 may be made of $ABO_3$-perovskite-type oxide including Pb. Especially, among the materials, $LiNbO_3$, $LiTaO_3$, and ZnO are preferable because the change of the surface velocity of their surface acoustic wave and the change of their piezoelectric constant are outstanding. The thickness of dielectric film 2 may be selected in accordance with the intended use; however, generally, it ranges between 0.1 micrometer and 10 micrometers.

Also, a configuration of a wireless sensor provided in a surface or a wall is not limited to the configuration described in the above embodiment, but any configuration which enables identifying the position or the state of a passerby on a surface can be adapted.

As described above, the present invention provides a control system including: plural wireless measuring units provided in a surface, each of which wireless measuring units, when receiving a radio signal, uses the radio signal as an energy source to measure a physical quantity, and generates and sends a radio signal having an attribute reflecting the measured physical quantity; a transmitter which transmits a radio signal to the wireless measuring units; a receiver which receives radio signals from the wireless measuring units; a storage unit which stores position data of the wireless measuring units in accordance with identification data of the wireless measuring units; a calculation unit which calculates physical quantities on the basis of the radio signals received by the receiver; a recognition unit which recognizes a distribution of the physical quantities calculated by the calculation unit with reference to position data stored in accordance with identification data specified by the radio signals received by the receiver; an identifying unit which identifies a state of an object on the surface on the basis of the distribution of the physical quantities recognized by the recognition unit; and a control unit which performs a control depending on the state of the object identified by the identifying unit.

According to an embodiment of the invention, the physical quantity may be at least one of pressure, light intensity, and temperature.

According to another embodiment of the invention, the control system may further includes a display which displays information, and the control unit may control, depending on the state of the object identified by the identifying unit, information displayed on the display.

According to another embodiment of the invention, the recognition unit, by comparing the physical quantities calculated by the calculation unit with pre-stored data, may recognize at least one of a presence or absence of the object, a position of the object, and a weight of the object, and the identifying unit may identify a state of the object on the surface on the basis of at least one of a presence or absence of the object, a position of the object, and a weight of the object recognized by the recognition unit.

According to another embodiment of the invention, the recognition unit may recognize, on the basis of the distribution of the physical quantities calculated by the calculation unit, a change in the physical quantities with time, and the identifying unit may identify a state of the object on the surface on the basis of the change in the physical quantities with time recognized by the recognition unit.

According to another embodiment of the invention, the surface may be at least one of a road, a floor, a floor mat, and a wall surface.

According to another embodiment of the invention, the transmitter, the receiver, the calculation unit, the recognition unit, and the identifying unit may be located away from the surface.

According to another embodiment of the invention, the object may be at least either of a person or a vehicle.

According to another embodiment of the invention, each of plural wireless measuring units may include: an exciter which receives a radio signal and generates a mechanical vibration; a vibration medium on which a surface acoustic wave is caused by the mechanical vibration generated by the exciter, and on which an attribute of the surface acoustic wave changes in response to physical quantity; and a transmitter which converts the surface acoustic wave generated on the vibration medium to an electrical signal and sends it as a radio signal.

Also, the present invention provides a surface where plural wireless measuring units are provided, each of which, when receiving a radio signal, uses the radio signal as an energy source to measure a physical quantity, and generates and sends a radio signal having an attribute reflecting the measured physical quantity.

According to an embodiment of the invention, each of plural wireless measuring units may include: an exciter which receives a radio signal and generates a mechanical vibration; a vibration medium on which a surface acoustic wave is caused by the mechanical vibration generated by the exciter, and on which an attribute of the surface acoustic wave changes in response to physical quantity; and a transmitter which converts the surface acoustic wave generated on the vibration medium to an electrical signal and sends it as a radio signal.

Also, the present invention provides a control device including: a transmitter which transmits a radio signal to plural wireless measuring units provided in a surface; a receiver which receives radio signals from the wireless measuring units; a storage unit which stores position data of the wireless measuring units in accordance with identification data of the wireless measuring units; a calculation unit which calculates physical quantities on the basis of the radio signals received by the receiver; a recognition unit which recognizes a distribution of the physical quantities calculated by the calculation unit with reference to position data stored in accordance with identification data specified by the radio signals received by the receiver; an identifying unit which identifies a state of an object on the surface on the basis of the distribution of the physical quantities recognized by the recognition unit; and a control unit which performs a control depending on the state of the object identified by the identifying unit.

According to an embodiment of the present invention, it is possible to sense the presence or absence of an object or the state of an object indoors or outdoors while requiring little maintenance.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described to best explain the principles of the invention and its practical applications, to thereby enable others skilled in the art to understand various embodiments of the invention and various modifications thereof, to suit a particular contemplated use. It is intended that the scope of the invention be defined by the following claims and their equivalents.

What is claimed is:

1. A control system comprising:
   a plurality of wireless measuring units provided in a surface of at least one of a road, a floor, a floor mat, and a wall surface, each of which wireless measuring units, when receiving a radio signal, uses the radio signal as an energy source to measure a physical quantity, and generates and sends a radio signal having an attribute reflecting the measured physical quantity,
   wherein each of a plurality of wireless measuring units includes:
      an exciter which receives a radio signal and generates a mechanical vibration;
      a vibration medium on which a surface acoustic wave is caused by the mechanical vibration generated by the exciter, and on which an attribute of the surface acoustic wave changes in response to physical quantity; and
      a transmitter which converts the surface acoustic wave generated on the vibration medium to an electrical signal and sends it as a radio signal;
   a transmitter which transmits a radio signal to the wireless measuring units;
   a receiver which receives radio signals from the wireless measuring units;
   a storage unit which stores position data of the wireless measuring units in accordance with identification data of the wireless measuring units;
   a calculation unit which calculates physical quantities on the basis of the radio signals received by the receiver;
   a recognition unit which recognizes a distribution of the physical quantities calculated by the calculation unit with reference to position data stored in accordance with identification data specified by the radio signals received by the receiver and determines at least one of a presence or absence of the object, a position of the object, and a weight of the object;

an identifying unit which identifies a state of an object on the surface on the basis of the distribution of the physical quantities recognized by the recognition unit;

a control unit which performs a control depending on the state of the object identified by the identifying unit; and a display which displays information, wherein the control unit controls, depending on the state of the object identified by the identifying unit, conditional information to be displayed on the display.

2. A control system according to claim 1, wherein the physical quantity is at least one of pressure, light intensity, and temperature.

3. A control system according to claim 1, further comprising a display which displays information, and wherein the control unit controls, depending on the state of the object identified by the identifying unit, information displayed on the display.

4. A control system according to claim 1, wherein:

the recognition unit, by comparing the physical quantities calculated by the calculation unit with pre-stored data, recognizes at least one of a presence or absence of the object, a position of the object, and a weight of the object; and the identifying unit identifies a state of the object on the surface on the basis of at least one of a presence or absence of the object, a position of the object, and a weight of the object recognized by the recognition unit.

5. A control system according to claim 1, wherein:

the recognition unit recognizes, on the basis of the distribution of the physical quantities calculated by the calculation unit, a change in the physical quantities with time; and the identifying unit identifies a state of the object on the surface on the basis of the change in the physical quantities with time recognized by the recognition unit.

6. A control system according to claim 1, wherein the surface is at least one of a road, a floor, a floor mat, and a wall surface.

7. A control system according to claim 1, wherein the transmitter, the receiver, the calculation unit, the recognition unit, and the identifying unit are located away from the surface.

8. A control system according to claim 1, wherein the object is at least either of a person or a vehicle.

9. A control system according to claim 1, wherein each of a plurality of wireless measuring units comprises:

an exciter which receives a radio signal and generates a mechanical vibration;

a vibration medium on which a surface acoustic wave is caused by the mechanical vibration generated by the exciter, and on which an attribute of the surface acoustic wave changes in response to physical quantity; and a transmitter which converts the surface acoustic wave generated on the vibration medium to an electrical signal and sends it as a radio signal.

10. A control device comprising:

a transmitter which transmits a radio signal to a plurality of wireless measuring units provided in a surface of at least one of a road, a floor, a floor mat, and a wall surface, wherein each of the plurality of wireless measuring devices units includes:

an exciter which receives a radio signal and generates a mechanical vibration;

a vibration medium on which a surface acoustic wave is caused by the mechanical vibration generated by the exciter, and on which an attribute of the surface acoustic wave changes in response to physical quantity; and a transmitter which converts the surface acoustic wave generated on the vibration medium to an electrical signal and sends it as a radio signal;

a receiver which receives radio signals from the wireless measuring units;

a storage unit which stores position data of the wireless measuring units in accordance with identification data of the wireless measuring units;

a calculation unit which calculates physical quantities on the basis of the radio signals received by the receiver;

a recognition unit which recognizes a distribution of the physical quantities calculated by the calculation unit with reference to position data stored in accordance with identification data specified by the radio signals received by the receiver and determines at least one of a presence or absence of the object, a position of the object, and a weight of the object;

an identifying unit which identifies a state of an object on the surface on the basis of the distribution of the physical quantities recognized by the recognition unit; and a control unit which performs a control depending on the state of the object identified by the identifying unit; and a display which displays information, wherein the control unit controls, depending on the state of the object identified by the identifying unit, conditional information to be displayed on the display.

* * * * *